Feb. 8, 1955     G. L. WOLFF     2,701,701
RECEPTACLE HOLDER
Filed June 5, 1951
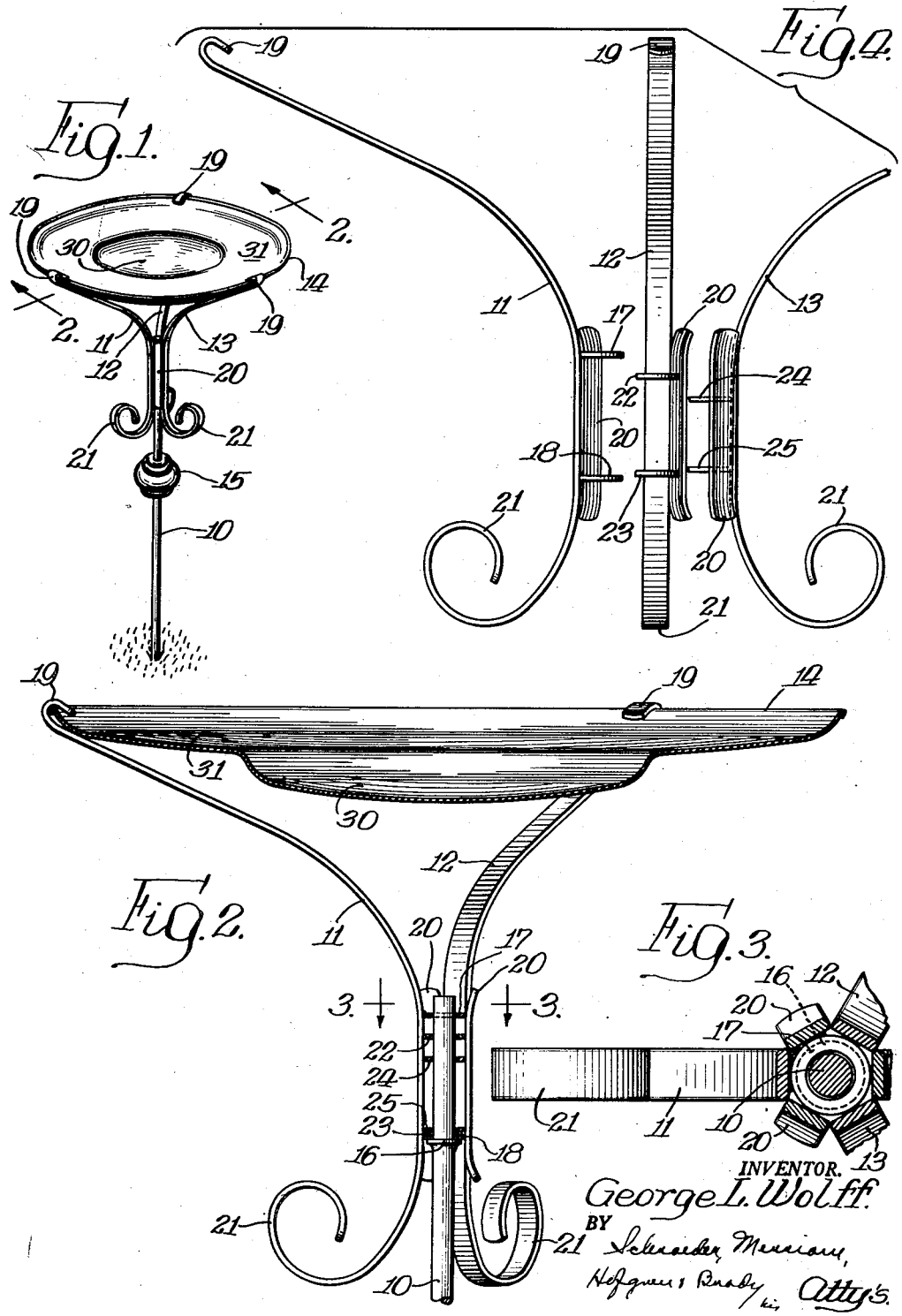
INVENTOR.
George L. Wolff

United States Patent Office 2,701,701
Patented Feb. 8, 1955

2,701,701

RECEPTACLE HOLDER

George L. Wolff, Michigan City, Ind.

Application June 5, 1951, Serial No. 229,919

2 Claims. (Cl. 248—158)

This invention relates to a receptacle holder. More particularly, it relates to a receptacle holder which may be quickly and easily assembled.

It is an object of this invention to provide a new and novel receptacle holder which may be transported while flat and may then be quickly and easily assembled at the point where it is to be used. Another object of the invention is to provide a bird bath which may be easily transported. Another object of the invention is to provide a bird bath in which the formation of slime will not prevent birds from making use of the facilities provided for them. A further object of the invention is to provide a bird bath which may be easily and quickly disassembled for transportation to a new location.

Other objects and advantages will become apparent from a description of one embodiment of this invention as illustrated in the accompanying drawing, in which:

Fig. 1 is a perspective view of a bird bath constructed according to this invention and set up on a lawn;

Fig. 2 is a sectional elevation of the top portion of the bath taken along the lines 2—2 of Fig. 1 showing the contour of the bowl and the manner in which the bowl supporting members are mounted on the main support rod;

Fig. 3 is a sectional view taken along the line 3—3 of Fig. 2 giving a further illustration of the means for mounting the supporting members; and, Fig. 4 is an exploded view of the bowl mounting members.

While the invention is susceptible of various modifications and alternative constructions it is herein shown and will hereinafter be described with reference to its application to a bird bath. It is not intended, however, that the invention be limited thereby to the specific construction disclosed. On the contrary, it is intended to cover all modifications and alternative constructions falling within the spirit and scope of the invention as defined in the appended claims.

Referring to Fig. 1 the device comprises an elongated rod 10 adapted for vertical positioning. For indoor use the rod 10 may be provided with a base (not shown). For outdoor use it may be emplaced in the ground. Three supporting members 11, 12 and 13 are positioned near the top of the rod 10 and serve as holding means for a bowl 14, which may be used to hold dirt for plants or water for a bird bath. If desired, a decoration 15 may be mounted on the rod 10 and this decoration may also serve as a handle.

Referring to Fig. 2 the rod 10 has a collar 16 mounted a short distance below the upper end thereof. This collar 16 serves as a means for seating the three supporting members 11, 12 and 13. Referring particularly to Fig. 4 the supporting member 11 has a pair of collars 17 and 18 which are spaced some distance apart. The upper end of the supporting member 11 is flared outwardly and has a tip portion 19 curved inwardly. The flared outward portion and curved inward tip portion 19 are disposed to hold the bowl 14. A spacer 20 extends to one side of the supporting member 11 between the collars 17 and 18. The bottom portion of the supporting member 11 is curled around as shown at 21 both for decorative purposes and to give a balanced appearance to the assembled device.

The supporting member 12 is identical to the supporting member 11 except that it has a pair of collars 22 and 23 which are not spaced so far apart as the collars 17 and 18. The collars 22 and 23 are spaced so as to nest within the space between the collars 17 and 18 of the supporting member 11. The numbering of the remaining portions of the supporting member 12 is the same as comparable portions of the supporting member 11.

The supporting member 13 is the same as the supporting member 11 except that a pair of mounting collars 24 and 25 are spaced still closer together so as to enable them to nest within the space between the collars 22 and 23 of the supporting member 12.

An assembled bird bath has a shape which is rather bulky and inconvenient for transportation. The parts of the bird bath illustrated may be shipped knocked down in a flat package. In order to assemble the bird bath, it is only necessary to hold the bowl 14 by the tips 19 of the supporting members 11, 12 and 13. The supporting members 11, 12 and 13 may then be gripped with the collars 22 and 23 occupying the space between the collars 17 and 18 and the collars 24 and 25 occupying the space between the collars 22 and 23 with all six of the supporting member mounting collars lined up. The rod 10 may be thrust through the collars and the supporting members will then be retained in position. The spacing of the supporting members 11, 12 and 13 around the rim of the bowl 14 is insured by the spacers 20 attached to each supporting member. The position assumed by the parts is best shown in Fig. 3.

The bowl 14 is formed as if it were a shallow bowl of large diameter with a center insert 30 comprised of an additional bowl of smaller diameter as best shown in Fig. 2. With this construction the bowl 14 may be filled up to the top of the rim portion 31. As water evaporates the bottom of the rim portion will be exposed all at once while the center insert 30 will still be full. The sudden exposure of the rim portion 31 avoids some of the slime formation which would take place in a bowl of uniformly increasing depth. At the same time birds, after using the center portion 30, are able to hop out to the rim portion 31. Where a bathing bowl has a uniformly increasing depth and slime has formed around the rim portion there have been instances where birds have been unable to surmount the slippery incline and have drowned. The bathing bowl of this invention avoids this defect by its use of the center portion 30.

While only three bowl supporting members are illustrated it is obvious that there could be additional supporting members if it were desirable to have them. However, the three-member support illustrated gives a stable device of satisfactory strength. It is desirable to have the supporting members 11, 12 and 13 constructed of a flat springy metal in order that they may have a firm grip at all times upon the rim of the bowl 14.

I claim:

1. A receptacle holder comprising at least three upwardly extending supporting members each having a straight portion and an adjoining outwardly flared portion for supporting a receptacle, each straight portion having a spacer member of similar configuration joined thereto along one side thereof, said straight portions and spacer members being positioned alternately in edge to edge relation, a plurality of inwardly extending nested collars scured respectively to said straight portions and having aligned openings, a rod threaded through the aligned openings in said collars to secure and maintain the supporting members together and means for supporting the holder in elevated position.

2. A receptacle holder comprising an elongated rod adapted for vertical positioning, a retaining collar on said rod spaced a short distance from the top end thereof, a plurality of supporting members having outwardly flaring end portions adapted to engage and position a receptacle, each of said supporting members having a spacer member extending to one side of a portion thereof and being in edge to edge relation between the supporting members to maintain substantially uniform spacing of said members around said rod, and a pair of spaced collars secured to each of said straight portions at right angles thereto, said collars being threaded about the rod in nested relation to maintain said supporting members mounted on said rod said retaining collar supporting said lowermost nested collars.

(References on following page)

References Cited in the file of this patent

UNITED STATES PATENTS

| | | |
|---|---|---|
| 165,444 | Gorham | July 13, 1875 |
| 409,930 | Cornillie | Aug. 27, 1889 |
| 692,103 | Bailey | Jan. 28, 1902 |
| 927,746 | Murphy | July 13, 1909 |
| 1,036,203 | Fackler | Aug. 20, 1912 |
| 1,366,710 | Anker | Jan. 25, 1921 |
| 1,369,315 | Anker | Feb. 22, 1921 |
| 1,508,470 | Partmann | Sept. 16, 1924 |
| 1,571,101 | Sternberg | Jan. 26, 1926 |
| 1,573,398 | Griffith | Feb. 16, 1926 |
| 1,823,616 | Leslie | Sept. 15, 1931 |